United States Patent
Van Eijndhoven et al.

(10) Patent No.: US 7,526,613 B2
(45) Date of Patent: Apr. 28, 2009

(54) DATA PROCESSING SYSTEM WITH PREFETCHING MEANS

(75) Inventors: Josephus Theodorus Johannes Van Eijndhoven, Eindhoven (NL); Martijn Johan Rutten, Eindhoven (NL); Evert-Jan Daniël Pol, Eindhoven (NL)

(73) Assignee: NXP B.V., Eindhoven (NL)

( * ) Notice: Subject to any disclaimer, the term of this patent is extended or adjusted under 35 U.S.C. 154(b) by 204 days.

(21) Appl. No.: 10/547,594

(22) PCT Filed: Feb. 25, 2004

(86) PCT No.: PCT/IB2004/050151

§ 371 (c)(1),
(2), (4) Date: Sep. 1, 2005

(87) PCT Pub. No.: WO2004/079489

PCT Pub. Date: Sep. 16, 2004

(65) Prior Publication Data

US 2006/0190688 A1 Aug. 24, 2006

(30) Foreign Application Priority Data

Mar. 6, 2003 (EP) .................................. 03100554

(51) Int. Cl.
*G06F 12/12* (2006.01)
(52) U.S. Cl. ................ 711/133; 711/137; 711/E12.022; 711/E12.037; 711/E12.069
(58) Field of Classification Search .................. 711/137, 711/133, E12.037, E12.069
See application file for complete search history.

(56) References Cited

U.S. PATENT DOCUMENTS

| | | | | |
|---|---|---|---|---|
| 5,787,472 A * | 7/1998 | Dan et al. | ..................... | 711/134 |
| 5,974,438 A * | 10/1999 | Neufeld | ....................... | 718/104 |
| 6,035,375 A * | 3/2000 | Yanai et al. | .................. | 711/129 |
| 6,226,715 B1 * | 5/2001 | Van Der Wolf et al. | ..... | 711/133 |
| 7,039,766 B1 * | 5/2006 | Smith | .......................... | 711/137 |
| 2003/0105926 A1* | 6/2003 | Rodriguez | ................... | 711/129 |
| 2003/0200194 A1* | 10/2003 | Arnold et al. | ................... | 707/1 |
| 2003/0236949 A1* | 12/2003 | Henry et al. | ................. | 711/137 |

* cited by examiner

*Primary Examiner*—Matt Kim
*Assistant Examiner*—Michael C Krofcheck
(74) *Attorney, Agent, or Firm*—Aaron Waxler

(57) ABSTRACT

The dismissing of cached data that is not expected to be further used is predicted instead of predicting future I/O operations and then data is fetched from the main memory to replace the dismissed data in the cache. Thus, firstly a location in a cache memory containing data, which is expected not to be further used, is identified, followed by performing a prefetch operation in order to request new data to refill the above location in the cache memory. Therefore, a data processing system comprises at least one processor (12) for processing streaming data, at least one cache memory (200) having a plurality of cache blocks (210), wherein one of said cache memories (200) is associated to each of said processors (12), and at least one cache controller (300) for prefetching data into said cache memory (200), wherein one of said cache controllers (300) is associated to each of said cache memories (200). Said cache controller (300) comprises determining means (350) for identifying at least one location in said cache memory (200) containing first data, which is predicted to be dismissible without penalty and prefetch means (320) for issuing a prefetch operation replacing said first data at said location with second data, which fit said location.

10 Claims, 2 Drawing Sheets

DATA PROCESSING SYSTEM WITH PREFETCHING MEANS

Figure 1:
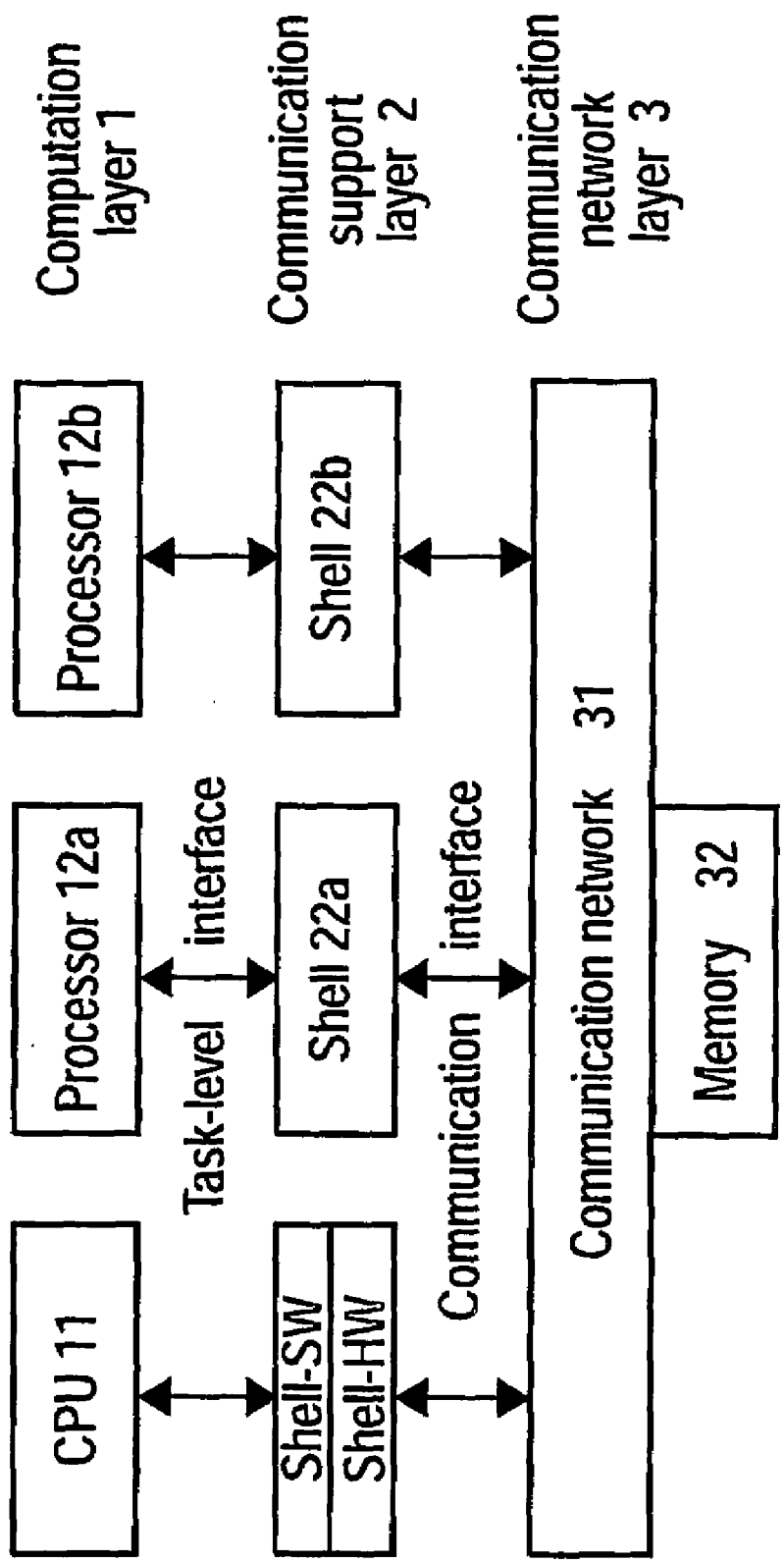

The invention relates to a data processing system optimised for processing dataflow applications, a method for prefetching data into a cache memory in a data processing environment optimised for processing dataflow applications, and a semiconductor means for use in a data processing environment optimised for processing dataflow applications.

The design efforts for data processing systems especially equipped for data flow application like high-definition digital TV, set-top boxes with time-shift functionality, 3D games, video conferencing, MPEG-4 applications, and the like has increased during recent years due to an increasing demand for such applications.

In stream processing, successive operations on a stream of data are performed by different processors. For example a first stream might consist of pixel values of an image, that are processed by a first processor to produce a second stream of blocks of DCT (Discrete Cosine Transformation) coefficients of 8×8 blocks of pixels. A second processor might process the blocks of DCT coefficients to produce a stream of blocks of selected and compressed coefficients for each block of DCT coefficients.

In order to realise data stream processing a number of processors are provided, each capable of performing a particular operation repeatedly, each time using data from a next data object from a stream of data objects and/or producing a next data object in such a stream. The streams pass from one processor to another, so that the stream produced by a first processor can be processed by a second processor and so on. One mechanism of passing data from a first to a second processor is by writing the data blocks produced by the first processor into the memory. The data streams in the network are buffered. Each buffer is realised as a FIFO, with precisely one writer and one or more readers. Due to this buffering, the writer and readers do not need to mutually synchronize individual read and write actions on the channel. Typical data processing systems include a mix of fully programmable processors as well as application specific subsystems dedicated to single application respectively.

An example of such an architecture is shown in Rutten et al. "Eclipse: A Heterogeneous Multiprocessor Architecture for Flexible Media Processing", IEEE Design and Test of Computers: Embedded Systems, pp. 39-50, July-August 2002. The required processing applications are specified as a Kahn process network, i.e. a set of concurrently executing tasks exchanging data by means of unidirectional data streams. Each application task is mapped on a particular programmable processors or one of the dedicated processors. The dedicated processors are implemented by coprocessors, which are only weakly programmable. Each coprocessor can execute multiple tasks from a single Kahn network or from multiple networks on a time-shared basis. The streaming nature of e.g. media processing applications result in a high locality of reference, i.e. consecutive references to the memory address of neighbouring data. Furthermore, a distributed coprocessor shell is implemented between the coprocessors and the communication network, i.e. the bus and the main memory. It used to absorb many system-level problems like multitasking, stream synchronisation and data transport. Due to its distributed nature, the shells can be implemented close to the coprocessor, which it is associated to. In each shell all data required for handling the streams incident to tasks being mapped on the coprocessor associated to the shell are stored in the shell's stream table.

The shells comprise caches in order to reduce data access latency occurring when reading or writing to a memory. Data, which is required to perform future processing steps are cached i.e. stored in a smaller memory, which is separate from the main memory and is arranged closed to a processor using the stored data. In other words a cache is used as an intermediate storage facility. By reducing the memory access latency the processing speed of a processor can be increased. If data words are merely to be accessed by the processor from its cache rather than from the main memory the access time will be significantly reduced.

In order to further reduce the data access latency prefetch methods are employed to predict upcoming input and output operations. Here, prefetching means that data is cached or transmitted from the main memory to a cache before a request for this data is received from a processor.

Generally speaking, two main problems arise when dealing with prefetching techniques. Firstly, in order to predict future input/output accesses to the memory the access pattern of the data processing must be recognized by observing the addresses of a series of input/output (I/O)-operations and then after examining this behaviour perform an extrapolation in order to predict upcoming I/O accesses for the memory. In the case of streaming data applications this extrapolation becomes very complex due to the fact, that other processes or streams in the system may access data in said memory so that interleaved I/O operations from other streams prevent accurate predictions.

Secondly, if it is predicted that a certain data word is to be processed during the next processing steps and this particular data word is not currently stored in the cache, it has to be fetched, i.e. transferred or retrieved, from the memory into the cache. However, cases exist where this prefetched data word is transferred to the cache to be stored therein, thereby replacing the data word currently stored at that position, while this data word may still be valuable, i.e. is required in future processing steps. Accordingly, this prefetch technique may lead to undesired cache misses, i.e. data needed in future processing steps is deleted.

U.S. Pat. No. 5,590,390 relates to a cache prefetching technique in an environment where the main memory is a mass storage such as a magnetic disc and the cache memory is used to store data prefetch from the mass storage. In particular, it discloses a prefetching technique where certain cached data, which would normally be decached or dismissed, are retained or recycled. One example for decaching data is the least-recently used (LRU) method, where the least recent data is dismissed or decached, in order to make room for new data in the cache memory. In other words the LRU method determines which data has not being accessed for the longest period of time are or currently cached data. According to the results of this method certain cached data is released from the cache in order to be able to reuse the cache space currently occupied by that data for caching some currently required uncached data. Furthermore, it is determined which data being the least recently used should so be retained in the cache based on its higher potential reuse and which data has a lesser probability of being reused and thus should be decached in order to cater for the possessors kind need for data.

The actual prefetching or cache-ahead is carried out by determining the number of data segments present in the cache which will be used during the next processing steps of the processor. If this number exceeded, then there is no need for prefetching data from the main memory. However, if this is not the case, a prefetch process is immediately initiated. The data to be prefetched is either the data immediately following the current data or the data immediately proceeding the current data. Usually the data succeeding the current data is the data to be prefetched. According to this prefetch method it is first determined which data segment is to be prefetched from the main memory and then the prefetched data is stored in the cache at a location which is determined by the modified least recent use method described above. However, although a modified LRU method is being used the danger of ache misses by overwriting data in the cache which is still needed by the processor is still resent.

U.S. Pat. No. 5,787,472 discloses a system and method for caching sequential data streams in a cache memory. In particular, it relates to a distributed video server each serving a number of the users on the basis of a video-on-amount. The video data are stored on discs while a cache memory is applied in order to buffer said video data. After data blocks have been read by a consuming process it is determined whether this data blocks should be discarded from the cache. First of all, it is determined whether free locations are available but otherwise an appropriate location is determined according to the LRU method.

Operating caches at high clock speeds is difficult for caches with high associativity. On the other hand, low associativity results in a small set of choices for choosing a victim location, and hence in an increased risk of dismissing valuable data. LRU based methods are less effective for such caches.

It is therefore an object of the invention to provide prefetching of data into a cache memory while reducing the occurrence of cache misses due to dismissing valuable data.

This object is solved by a data processing system according to claim 1, a method for prefetching data into a cache memory according to claim 9, and a semiconductor means for use in a data processing environment optimised for processing dataflow applications according to claim 10.

The invention is based on the idea to predict the dismissing of cached data that is not expected to be further used, instead of predicting future I/O operations. Next, data is fetched from the main memory to replace the dismissed data in the cache. Thus, firstly a location (i.e. a victim location) in a cache memory containing data, which is expected not to be further used, is identified, followed by performing a prefetch operation in order to request new data to refill the above location in the cache memory.

Therefore, a data processing system comprises at least one processor 12 for processing streaming data, at least one cache memory 200 having a plurality of cache blocks, wherein one of said cache memories 200 is associated to each of said processors 12, and at least one cache controller 300 for prefetching data into said cache memory 200, wherein one of said cache controllers 300 is associated to each of said cache memories 200. Said cache controller 300 comprises determining means 350 for identifying at least one location in said cache memory 200 containing first data, which is predicted to be dismissible without penalty, and prefetch means 320 for issuing a prefetch operation replacing said first data at said location with second data that fit said location. Accordingly, the probability of cache misses by overwriting cached data, that is still needed in the cache, is reduced.

In a further aspect of the invention said data processing system is optimised for processing dataflow applications with tasks and data streams, where different streams compete for shared cache resources.

In a further aspect of the invention the identification of the location is carried out restricted on a specific predetermined range of addresses.

In a preferred aspect of the invention, said determining means determines if the last data word of said first data words in a cache block in the cache memory has been accessed, and said prefetch means prefetches second data words from a memory, which replace said first data words in said cache block.

If this is carried out in a data processing system that is designed to process streaming data subsequent read operations from a single stream correspond to a continuous linear range in the memory. Therefore, when the last data word in a cache block has been accessed by a reading operation it can be assumed that all data words within that cache block have been used and are not needed in the following operations of the processor. Accordingly, the memory space and the cache block can be used for data from the main memory which will be used in subsequent operations. Now a data block is prefetched from a new location or address in the memory, wherein this data block must fit to the cache location of the dismissed cache data.

In still a further aspect of the invention, said determining means invalidates data words present among first data words in said cache block, and said prefetch means prefetches second data words from a memory, which fit said location of said invalidated first data words in said cache block.

Accordingly, once the prefetched second data block arrives at the cache memory it will be stored automatically at the location of the dismissed data. The reading operations are expected to access this prefetched data in the near future, since the access of streaming data is performed in a linear order.

In a further preferred aspect the invalidated data are reloaded from said memory. This will reduce the latency of a data access, since for streaming data the reading operation is expected to access this data in the near future.

The invention is also related to a method for prefetching data into a cache memory, wherein said cache memory comprises a plurality of cache blocks. At least one location in said cache memory 200 containing first data, which is predicted to be dismissible without penalty, is identified. Then a prefetch operation is issued by replacing said first data at said location with second data, which fit said selected location.

The invention is furthermore related to a semiconductor means for use in a data processing environment optimised for processing dataflow applications with tasks and data streams, where different streams compete for shared cache resources. Said device comprises a cache memory 200 having a plurality of cache blocks, and a cache controller 300 for prefetching data into said cache memory 200, wherein said cache controller 300 is associated to said cache memory 200. Said cache controller 300 comprises determining means 350 for identifying at least one location L in said cache memory 200 containing first data, which is predicted to be dismissible without penalty, and prefetch means 320 for issuing a prefetch operation replacing said first data at said location with second data which fit said location.

Further aspects of the invention are described in the dependent claims.

Figure 2:
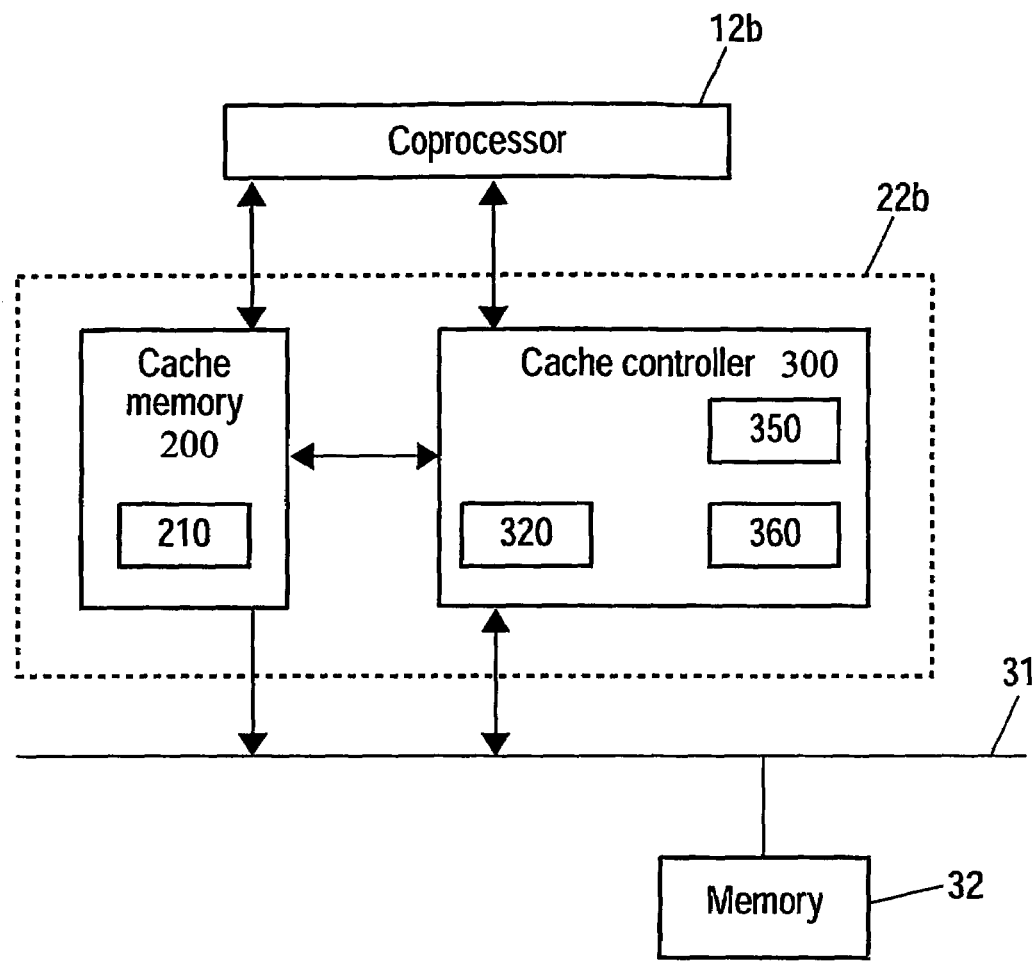

These and other aspects of the invention are described in more detail with reference to the drawings, the figures showing:

FIG. 1 a schematic block diagram of an architecture of a stream based processing system according to the invention, and FIG. 2 a block diagram of a coprocessor, a cache, and a cache controller according to the invention.

FIG. 1 shows a processing system for processing streams of data objects according to a preferred embodiment of the invention. The system can be divided into different layers, namely a computation layer 1, a communication support layer 2 and a communication network layer 3. The computation layer 1 includes a CPU 11, and two processors or co-processors 12a, 12b. This is merely by way of example, obviously more processors may be included into the system. The communication support layer 2 comprises a shell 21 associated to the CPU 11 and shells 22a, 22b associated to the processors 12a, 12b, respectively. The communication network layer 3 comprises a communication network 31 and a memory 32.

The processors 12a, 12b are preferably dedicated processor; each being specialised to perform a limited range of stream processing function. Each processor is arranged to apply the same processing operation repeatedly to successive data objects of a stream. The processors 12a, 12b may each perform a different task or function, e.g. variable length decoding, run-length decoding, motion compensation, image scaling or performing a DCT transformation. In operation each processor 12a, 12b executes operations on one or more data streams. The operations may involve e.g. receiving a stream and generating another stream or receiving a stream without generating a new stream or generating a stream without receiving a stream or modifying a received stream. The processors 12a, 12b are able to process data streams generated by other processors 12b, 12a or by the CPU 11 or even streams that have generated themselves. A stream comprises a succession of data objects which are transferred from and to the processors 12a, 12b via said memory 32.

The shells 22a, 22b comprise a first interface towards the communication network layer being a communication layer. This layer is uniform or generic for all the shells. Furthermore the shells 22a, 22b comprise a second interface towards the processor 12a, 12b to which the shells 22a, 22b are associated to, respectively. The second interface is a task-level interface and is customised towards the associated processor 12a, 12b in order to be able to handle the specific needs of said processor 12a, 12b. Accordingly, the shells 22a, 22b have a processor-specific interface as the second interface but the overall architecture of the shells is generic and uniform for all processors in order to facilitate the re-use of the shells in the overall system architecture, while allowing the parameterisation and adoption for specific applications.

The shell 22a, 22b comprise a reading/writing unit for data transport, a synchronisation unit and a task switching unit. These three units communicate with the associated processor on a master/slave basis, wherein the processor acts as master. Accordingly, the respective three unit are initialised by a request from the processor. Preferably, the communication between the processor and the three units is implemented by a request-acknowledge handshake mechanism in order to hand over argument values and wait for the requested values to return. Therefore the communication is blocking, i.e. the respective thread of control waits for their completion.

The shells 22a, 22b are distributed, such that each can be implemented close to the processor 12a, 12b that it is associated to. Each shell locally contains the configuration data for the streams which are incident with tasks mapped on its processor, and locally implements all the control logic to properly handle this data. Accordingly, a local stream table may be implemented in the shells 22a, 22b that contains a row of fields for each stream, or in other words, for each access point.

Furthermore, the shells 22 comprise a data cache for data transport, i.e. read operation and write operations, between the processors 12 and the communication network 31 and the memory 32. The implementation of a data cache in the shells 22 provide a transparent translation of data bus widths, a resolvement of alignment restrictions on the global interconnect, i.e. the communication network 31, and a reduction of the number of I/O operations on the global interconnect.

Preferably, the shells 22 comprise the cache in the read and write interfaces, however these caches are invisible from the application functionality point of view. The caches a play an important role in the decoupling the processor read and write ports from the global interconnect of the communication network 3. These caches have the major influence on the system performance regarding speed, power and area.

For more detail on the architecture according to FIG. 1 please refer to Rutten et al. "Eclipse: A Heterogeneous Multiprocessor Architecture for Flexible Media Processing", IEEE Design and Test of Computers: Embedded Systems, pp. 39-50, July-August 2002.

FIG. 2 shows a part of the architecture according to FIG. 1. In particular, a processor 12b, the shell 22b, the bus 31 and the memory 32 are shown. The shell 22b comprises a cache memory 200 and a cache controller 300 as part of its data transport unit. The cache controller 300 comprises an determining means 350, a prefetch means 320, and optionally a marking means 360. The cache memory 200 may be divided into different cache blocks 210.

A prefetch operation within the system is controlled by the shell 22 but is initiated by either a read request from the coprocessor 12b or an invalidate request. Since the coprocessor 12b is designed to process streaming data it is assumed that subsequent read requests from the coprocessor 12b originating from the processing of a single stream are performed on a successive, linear memory address range.

The determining means 350 determines whether the last data word in the cache block 210 has been accessed by a read operation from the processor 12b. If this is the case, it can be assumed that all data words within that cache block 210 have been accessed during preceding read operations, so that all data words in said cache block 210 are not required any more in upcoming processing steps. Accordingly, these data words can be dismissed, and said prefetch means 320 prefetches a data block from the memory 32. The newly prefetched data block must fit into the cache block 210, i.e. the data block to be prefetched must be of the same size as the data block which can be dismissed. In particular, the data block to be prefetched is retrieved from a location in said memory 32 at an address which is the next higher address of the previous address of said first data in said memory 32 of the data block to be dismissed. In other words, the data block to be prefetched must fit into the storage space of the cache block 210 and the space of the data block to be dismissed. Additionally, the prefetch operation must be performed according to the restrictions of the cache organisation.

Optionally, when the determining means 350 determines that the last data word in the cache block 210 has been accessed by a read operation from the processor 12b, all data words within that cache block 210 can be dismissed and are therefore marked for dismissal by said marking means 360. Thereafter, said prefetch means 320 prefetches a data block from the memory 32. The newly prefetched data block must fit into the cache block 210, i.e. the data block to be prefetched must be of the same size as the data block which is marked for dismissal. In particular, the data block to be prefetched is retrieved from a location in said memory 32 at an address which is the next higher address of the previous address of said first data in said memory 32 of the data block marked for dismissal.

The prefetching technique according to the invention is advantageous since the prefetched data block will be automatically stored at the cache block 210, i.e. the location of the data block to be dismissed, as soon as the prefetched data block is retrieved from said memory 32 and arrives in the cache memory 200. This prefetching operation is justified, since said processor 12b is expected to access the prefetched data block within the next upcoming processing steps due to the fact that the data processing is performed on streaming data and the corresponding reading operations and memory accesses occur in linear order.

An alternative technique to determine data in said cache memory 200 which can be dismissed, is to check for invalidated data. In the data processing system according to FIG. 1 comprising several processors it is essential to perform cache coherency to insure that each processor only accesses those data values from a shared memory which are updated correctly. When the processor 12b accesses data from a memory via its cache memory 200 the validity of the read data must be confirmed. However, the techniques used for the invalidation of data are not subject to the present invention but are well known from the prior art.

The determining means 350 determines whether there are invalidated data words present among the data words in a cache block 210. If any invalidated data words are found by the determining means 350, said prefetch means 320 prefetches data words from the memory 32, which correspond to the address of the dismissed cache data, i.e. the invalidated data. In other words the prefetch is performed by reloading the invalidated data in said cache memory. Alternatively, the invalidated data words are marked for dismissal by the marking means 360 before being reloaded.

The prefetch operation is justified, since the reading processor is expected to access this data, i.e. the invalidated data, within the next processing steps. Additionally, the prefetch is only performed for cache locations which fall within the address range of stream buffers.

The invention claimed is:

1. Data processing system, comprising:
    at least one processor (12) for processing streaming data;
    at least one cache memory (200) having a plurality of cache blocks (210), wherein one of said cache memories (200) is associated to each of said processors (12), and
    at least one cache controller (300) for prefetching data into said cache memory (200), wherein one of said cache controllers (300) is associated to each of said cache memories (200);
    said cache controller (300) comprising:
        determining means (350) for identifying at least one location in said cache memory (200) containing first data, which is predicted to be dismissible without penalty, said determining means being configured to determine if the last data word of first data words in a cache block (210) has been accessed by a reading operation from the at least one processor so that said first data words can be dismissed from the cache block; and
        prefetch means (320) for issuing a prefetch operation replacing said first data at said location with second data which fit said location, said second data being prefetched from a memory (32), said prefetch means being configured to prefetch second data words from said memory, which replace said first data words in said cache block with said second data words, said second data words being of the same size as the first data words.

2. System according to claims 1, wherein said data processing system is optimized for processing dataflow applications with tasks and data streams, where different streams compete for shared cache resources.

3. System according to claim 2,
    wherein said determining means (350) is configured to perform the identification of said location restricted to a predetermined range of addresses.

4. System according to claim 1, wherein
    said prefetch means (320) is furthermore configured to prefetch said second data words from a second address in said memory (32), wherein said second address is the next higher address from a first address corresponding to the previous address of said first data words in said memory (32), and wherein said second data words fit said selected location of said first data words.

5. System according to claim 2, wherein
    said determining means (350) is configured to determine invalidated data words among first data words in said cache block (210), and
    said prefetch means (320) is configured to prefetch second data words from said memory (32), which fit the location of said invalidated first data words in said cache block (210).

6. System according to claim 5,
    wherein said first data words are reloaded from said memory (32).

7. System according to claim 2, wherein
    said determining means (350) is configured to determine if first data words in said cache block (210) do not belong to the stream of data currently operated by the processor, and
    said prefetch means (320) is configured to prefetch second data words from a memory (32), which fit the location of said first data words in said cache block (210).

8. Method for prefetching data into a cache memory (200), wherein said cache memory (200) comprises a plurality of cache blocks (210), comprising the steps of:
    a) identifying at least one location in said cache memory (200) containing first data, which is predicted to be dismissible without penalty, including determining if the last data word of first data words in a cache block has been accessed by a reading operation so that said first data words can be dismissed from the cache block; and then
    b) issuing a prefetch operation by replacing said first data at said location with second data, which fit said location, said second data being prefetched from a memory (32), including prefetching second data words from said memory, which replace said first data words in said cache block with said second data words, said second data words being of the same size as the first data words.

9. Method according to claim 8, wherein said method is performed in a data processing environment optimized for processing dataflow applications with tasks and data streams, where different streams compete for shared cache resources, wherein said cache memory (200) comprises a plurality of cache blocks.

10. Semiconductor means for use in a data processing environment optimized for processing dataflow applications with tasks and data streams, where different streams compete for shared cache resources, comprising:
    a cache memory (200) having a plurality of cache blocks (210), and
    a cache controller (300) for prefetching data into said cache memory (200), wherein said cache controller (300) is associated to said cache memories (200);
    said cache controller (300) comprising:
        identification means (350) for identifying at least one location in said cache memory (200) containing first data, which is predicted to be dismissible without penalty, said identifying means being configured to determine if the last data word of first data words in a cache block (210) has been accessed by a reading operation so that said first data words can be dismissed from the cache block; and prefetch means (320) for issuing a prefetch operation replacing said first data at said location with second data which fit said location, said second data being prefetched from a memory (32), said prefetch means being configured to prefetch second data words from said memory, which replace said first data words in said cache block with said second data words, said second data words being of the same size as the first data words.

* * * * *